United States Patent Office 3,184,503
Patented May 18, 1965

---

3,184,503
1-HALO-2-(N-ACYLCARBAMYLOXY)-3-ARYLOXY PROPANES
Manuel M. Baizer, Dayton, Ohio, assignor to S. B. Penick and Company, New York, N.Y., a corporation of Delaware
No Drawing. Original application Apr. 25, 1960, Ser. No. 24,250, now Patent No. 3,168,525, dated Feb. 2, 1965. Divided and this application July 10, 1962, Ser. No. 213,082
7 Claims. (Cl. 260—482)

This application is a divisional application of application Serial No. 24,250, filed April 25, 1960, now Patent No. 3,168,525.

The present invention relates to processes involving the seriatim acylation and cyclization of substituted carbamyloxy propanes to form substituted oxazolidones and to certain intermediate compositions resulting from the acylation step.

The class of compounds identified as 5-(substituted-methyl)-2-oxazolidones, with a wide variety of 5-substituent organic radicals, is known in the art as a group of substances useful per se and as intermediates for making R—$CH_2CH(OH)CH_2NH_2$ amino-alcohols and their corresponding beta-halo amines by known procedures.

In its process aspect, the present invention resides in the concept of making certain 5-(substituted-methyl)-2-oxazolidones, by reacting a 1-halo-2-carbamyloxy-3-substituted propane with an acylating agent to produce a 1-halo-2-(N-acylcarbamyloxy)-2-substituted propane and cyclizing said propane. In its composition aspect, the present invention resides in the concept of 1-halo-2-(N-acylcarbamyloxy)-3-substituted propanes wherein the 3-substituent is a cyclic organic ether radical attached through the oxygen atom. Since the acyl radical of the acylating agent is a non-functional group and does not affect the course of the reaction, any substance commonly employed as an acylating agent can be used in the process, although agents having from one to ten carbon atoms in the acyl moiety are preferred because of present availability and economy. In view of the fact certain of the acylated chloro intermediates are herein claimed, it is specifically mentioned that all four halogens are equivalent in the process and that the cyclic organic radical is an aryloxy or arylthio radical of the benzene and naphthalene ether series, whether unsubstituted or substituted by one or more low molecular weight moieties such as lower-alkyl, lower-alkoxy, halo, nitro, amino and trifluoromethyl. It is seen that the nature of the 3-substituent on the starting propane determines the nature of the 5-substituent in the oxazolidone prepared by the instant process.

In carrying out the acylation step of the process, the 1-halo-2-carbamyloxy-3-substituted propane is mixed with an acylating agent and, desirably, an acid catalyst. The mixture is heated, preferably, on a steam bath and then under reflux until the reaction is substantially complete and the 1-halo-2-(N-acylcarbamyloxy)-3-substituted propane is recovered from the crude reaction product, or employed directly without purification or recovery, as the starting material following cyclization step. Among the acid catalysts which can be used are mineral acids as sulfuric, hydrochloric; organic acids as p-toluenesulfonic; and other Lewis acids commonly known by chemists to promote acylation of the amino group. The acylating agents of choice are the lower alkanoic acid chlorides and anhydrides.

In carrying out the cyclization step of the process, the 1-halo-2-(N-acylcarbamyloxy)-3-substituted propane can be cyclized directly to yield the final product, a 5-substituted-methyl-2-oxazolidone by reaction with a strong alkali, such as sodium hydroxide, potassium hydroxide, et cetera, at a temperature ranging from room temperature to about 70 or 80 degrees centigrade. Care must be taken to avoid maintaining the reaction mixture too long at the elevated temperature, to avoid decomposition of the 5-substituted-methyl-2-oxazolidone.

Alternatively, the cyclization step of the process can be carried out by reacting a mild alkali, such as sodium carbonate, potassium carbonate, or ammonium hydroxide, with the 1-halo-2-(N-acylcarbamyloxy)-3-substituted propane to obtain a mixture of the final product, the 5-substituted-methyl-2-oxazolidone and an intermediate 5-substituted-methyl-3-acyl-2-oxazolidone. The intermediate 5-substituted-methyl-3-acyl-2-oxazolidone can be separated from the final product and separately hydrolyzed with alkali to produce an additional quantity of the final product, the 5-substituted-methyl-2-oxazolidone.

The starting materials for conducting the process of the invention, that is, the 1-halo-2-carbamyloxy-3-substituted propanes can be prepared as follows: The appropriate 3-substituted-1,2-propanediol is condensed with a carbonic acid ester ($R_2CO_3$) to form the corresponding 4-substituted-2-dioxolone. Processes for carrying out this reaction are disclosed, for example, in United States Patents 2,770,649 and 2,813,104. Next, the 4-substituted-2-dioxolone is ammonolyzed with ammonia in a solvent to yield a mixture of two isomers, a 1-hydroxy-2-carbamyloxy-3-substituted propane and a 1-carbamyloxy-2-hydroxy-3-substituted propane. This mixture results because the dioxolone ring opens at different positions upon ammonolysis. The isomers can be separated by fractional crystallization. The procedures for carrying out this ammonolysis are disclosed in Baizer et al. in the Journal of Organic Chemistry, volume 22, pages 1595 to 1599 (1957).

Where a 1-chloro-2-carbamyloxy-3-substituted propane is desired as the starting material for the process of the invention, the isomeric mixture, obtained as outlined in the previous paragraph, can, without separation of isomers, be treated with thionyl chloride to produce chlorination of the 1-hydroxy-2-carbamyloxy-propane and both chlorination and rearrangement of the 1-carbamyloxy-2-hydroxy-propane and yield the 1-chloro-2-carbamyloxy-propane. Procedures for carrying out this process are also disclosed in the above-mentioned Baizer et al. paper.

Throughout the specification, where the word "percent" is used alone, this means percent by weight.

The following examples illustrate physical embodiments of the inventive concepts:

EXAMPLE 1

*Conversion of 1-chloro - 2 - carbamyloxy-3-(o-methoxyphenoxy)propane to 5-(o - methoxyphenoxymethyl)-2-oxazolidone*

Prepare the starting material, 1-chloro-2-carbamyloxy-3-(o-methoxyphenoxy)propane as follows:

Melt 99 grams of 1,2 - dihydroxy - 3 - (o-methoxyphenoxy)propane. Add 1.4 grams of sodium methoxide and 118 grams of dry diethyl carbonate to the melt. Distill out the ethanol formed by the ester inter-change reaction until the inside temperature of the reaction mixture reaches 120 degrees centigrade. Then add 1.5 grams of ammonium chloride and recover the excess diethyl carbonate by vacuum distillation. The residue contains 4-(o-methoxyphenoxymethyl)dioxolone melting at 68.4–69.0 degrees centigrade. While stirring, add 100 milliliters of isopropyl alcohol to the residue. Next add a solution of 17 grams of ammonia gas in 500 milliliters of isopropyl alcohol. Close the system and continue stirring overnight. Thereafter, distill the mixture in vacuo to remove gas and isopropyl alcohol. To remove the last traces of isopropyl alcohol, add toluene to the residue and complete the removal of solvent by distillation, leaving a residue. Add 400 milliliters of toluene to dissolve the residue. Next add 65 grams of thionyl chloride to the solution. Warm the mixture to 50 degrees centigrade and commence bubbling dry air through the mixture to sweep out gases. While continuing the bubbling of air, raise the temperature to 80–85 degrees centigrade and maintain it there for two hours. Remove part of the toluene by distillation. Cool the solution with the formation of a precipitate. Filter the precipitate. Concentrate the filtrate by removing toluene by distillation. Cool the concentrated filtrate with the resultant formation of a second precipitate. Filter the second precipitate and combine it with the first precipitate to obtain a total of 104.5 grams of 1 - chloro - 2 - carbamyloxy - 3-(o-methoxyphenoxy)propane (80.7 percent yield).

Carry out the acylation and cyclization of the invention as follows: Mix one part of 1-chloro-2-carbamyloxy-3-(o-methoxyphenoxy)propane, prepared above, with a molar excess of acetic anhydride and a catalytic quantity of p-toluenesulfonic acid. Heat the mixture on a steam bath for one hour. Thereafter, while heating the mixture to maintain it under reflux, add alcohol. The mixture dissolves in the alcohol. Next, while maintaining the solution at about 70 degrees centigrade, add sodium hydroxide. A precipitate forms shortly after the completion of the addition of the sodium hydroxide. Stir and cool the mixture for one hour. Filter and dry the precipitate to obtain 5 - (o - methoxyphenoxymethyl)-2-oxazolidone melting 140–145 degrees centigrade.

EXAMPLE 2

*Preparation of 5-(o-methoxyphenoxymethyl)-2-oxazolidone with isolation of the intermediate 1-chloro-2-(N-acetylcarbamyloxy)-3-(o-methoxyphenoxy)propane*

Dissolve 5 grams of 1 - chloro - 2 - carbamyloxy- 3-(o-methoxyphenoxy)propane and 0.2 gram of p-toluenesulfonic acid in 40 milliliters of acetic anhydride. Heat the solution on a steam bath for one hour. Remove the excess acetic anhydride by evaporation in vacuo. Add 5 milliliters of methanol to the residual solution remaining after removal of the excess acetic anhydride. Evaporate the solution to dryness, leaving a residue. Dissolve the residue in hot methanol. Cool the solution with resultant precipitation. Filter and dry the first crop of solid precipitate weighing 4.3 grams and melting at 110.0–111.5 degrees centigrade. Evaporate methanol from the filtrate to concentrate the solution. Cool the solution with resultant precipitation of a second crop of product. Filter and dry the second crop of solid precipitate weighing 0.6 gram and melting at 109.0–110.5 degrees centigrade. Evaporate methanol from the filtrate to concentrate the solution. Cool the solution with resultant precipitation of a third crop of product. Filter and dry the third crop of solid product weighing 0.7 gram and melting at 90–95 degrees centigrade. Combine the first, second and third crops into 5.6 grams of crude 1-chloro-2-(N-acetylcarbamyloxy)-3-(o - methoxyphenoxy)propane. Recrystallize a sample for analysis from ethanol solvent and obtain an analytical sample melting at 111.0–111.5 degrees centigrade.

Analysis of the sample is as follows:

|  | Percent carbon | Percent hydrogen | Percent chlorine |
|---|---|---|---|
| Calculated | 51.74 | 5.35 | 11.75 |
| Found | 52.75 | 5.61 | 11.7 |

Dissolve 3.02 grams of the above 1-chloro-2-(N-acetylcarbamyloxy)-3-(o-methoxyphenoxy)propane in 9 milliliters of ethanol at 60 degrees centigrade. Cool the solution to 27 degrees centigrade with the formation of a precipitate. While stirring the mixture, add 16 milliliters of 5 percent sodium hydroxide solution. The temperature rises to 40 degrees centigrade and the solution becomes almost clear momentarily. Soon a precipitate forms. Stir the mixture for two hours. Filter the precipitate to recover 1.85 grams of crude 5-(o-methoxyphenoxymethyl)-2-oxazolidone, melting at 137–139 degrees centigrade. Recrystallize samples from ethanol solvent to produce purer portions melting at 140–145 degrees centigrade.

EXAMPLE 3

*Preparation of 5-(o-methoxyphenoxymethyl)-2-oxazolidone from 1-chloro-2-carbamyloxy-3-(o-methoxyphenoxy)propane*

Dissolve 20.76 grams of 1-chloro-2-carbamyloxy-3-(o-methoxyphenoxy)propane and 0.4 gram of p-toluenesulfonic acid in 9 grams of acetic anhydride. Heat the solution for one hour at 100–110 degrees centigrade, to form a molten mass. Cool 199 milliliters of an aqueous solution of 1.285 normal sodium hydroxide to about 14 degrees centigrade. While stirring the aqueous solution, pour the molten mass into the solution. Five minutes after the pouring is complete, crystals begin precipitating. Stir the mixture for one hour at room temperature and then filter to recover 13.3 grams (74.5 percent yield) of crude 5-(o-methoxyphenoxymethyl)-2-oxazolidone, melting at 136–139 degrees centigrade. Recrystallize to get product melting 140–145 degrees centigrade.

EXAMPLE 4

*Preparation of 5-(o-methoxyphenoxymethyl)-2-oxazolidone from a mixture of 1-hydroxy-2-carbamyloxy-3-(o-methoxyphenoxy)propane and 1-carbamyloxy-2-hydroxy-3-(o-methoxyphenoxy)propane*

Mix 8.435 grams of 1-carbamyloxy - 2 - hydroxy-3-(o-methoxyphenoxy)propane and 3.615 grams of 1-hydroxy-2-carbamyloxy-3-(o-methoxyphenoxy)propane in 50 milliliters of toluene at 25 degrees centigrade. Add 6.5 grams of thionyl chloride to the mixture. Warm the mixture to about 50 degrees centigrade and commence bubbling dry air through the mixture to sweep out gases. While continuing to bubble air, raise the temperature of the mixture to about 80 degrees centigrade and maintain this temperature for two hours. Thereafter, remove the toluene by distillation, leaving a residue. To the residue, add 5.6 grams of acetic anhydride and 0.1 gram of p-toluenesulfonic acid. Heat the mixture on a steam bath for one hour. Thereafter, while maintaining the mixture under reflux, add 20 milliliters of ethanol into which the mixture dissolves. Next, while maintaining the mixture at a temperature of 70 degrees centigrade, add 130 milliliters of sodium hydroxide thereto. Precipitation of a solid begins shortly after the addition of sodium hydroxide is completed. Stir and cool the mixture for one hour. Filter the mixture to recover 8.0 grams of solid crude 5-(o-methoxyphenoxymethyl)-2-oxazolidone, melt-at 137–140 degrees centigrade.

EXAMPLE 5

*Production of intermediate 1-chloro-2-(N-acetylcarbamyloxy) - 3 - (o-chlorophenoxy)propane and 5-(o-chlorophenoxymethyl)-2-oxazolidone*

Preparing the starting material, 1-chloro-2-carbamyloxy-3-(o-chlorophenoxy)propane, as follows:

Add 202.5 grams (1 mole) of 3-(o-chlorophenoxy)-1,2-propanediol to a reaction flask. Heat the flask to 100 degrees centigrade to melt the diol. Add 2.8 grams of sodium methylate to the molten diol. Add 236 grams (2 moles) of diethyl carbonate to the mixture. Heat the mixture to distill off the alcohol formed by the reaction through a fractionating column. After the theoretical quantity of alcohol has distilled off, add 3.0 grams of ammonium chloride to the mixture to destroy the sodium methylate catalyst and arrest further reaction.

Distill off the excess diethyl carbonate under reduced pressure. Remove a sample of the material for analysis of the cyclic carbonate. Crystallize the sample twice from anhydrous isopropyl alcohol to obtain 4-(o-chlorophenoxymethyl)dioxolone melting at 109.0–109.3 degrees centigrade and having the following percentage analysis; based on an empirical formula of $C_{10}H_9O_4Cl$:

|  | Carbon | Hydrogen |
|---|---|---|
| Calculated | 52.52 | 3.93 |
| Found | 53.15 | 3.96 |

Next, the 4-(o-chlorophenoxymethyl)dioxolone is ammonolyzed to a mixture of the isomers 1-hydroxy-2-carbamyloxy-3-(o-chlorophenoxy)propane and 1-carbamyloxy-2-hydroxy-3-(o-chlorophenoxy)propane. Stir the crude 4-(o-chlorophenoxymethyl)dioxolone overnight with 1200 milliliters of isopropyl alcohol containing 34 grams (2 moles) of anhydrous ammonia. Heat the mixture to reflux in order to remove excess ammonia. Add charcoal and mix. Filter. Allow the filtrate to cool with resultant precipitation of a crude 1-carbamyloxy-2-hydroxy-3-(o-chlorophenoxy)propane. Filter. Concentrate the filtrate and cool to obtain a second crop of this compound. Repeat the concentration and crystallization to obtain several further crops of crude 1-carbamyloxy-2-hydroxy-3-(o-chlorophenoxy)propane. After several concentrations, evaporate the filtrate to dryness. Fractionally crystallize the residue remaining after evaporation from ethyl acetate solvent to obtain crystalline 1 - hydroxy - 2 - carbamyloxy - 3 - (o-chlorophenoxy)propane. The total crystalline product obtained is 230 grams (94 percent yield).

The pure 1 - carbamyloxy-2-hydroxy-3-(o-chlorophenoxy)propane melts at 98.4–98.9 degree centigrade and has the following percentage analysis; based on an empirical formula of $C_{10}H_{12}O_4ClN$:

|  | Carbon | Hydrogen | Nitrogen |
|---|---|---|---|
| Calculated | 48.87 | 4.92 | 5.70 |
| Found | 48.99 | 5.16 | 5.74 |

The pure 1-hydroxy-2-carbamyloxy-3-(o-chlorophenoxy)propane melts at 123.2–123.5 degrees centigrade and has the following percentage analysis, based on an empirical formula of $C_{10}H_{12}O_4Cln$:

|  | Carbon | Hydrogen | Nitrogen |
|---|---|---|---|
| Calculated | 48.87 | 4.92 | 5.70 |
| Found | 49.49 | 5.01 | 6.07 |

The chlorination and rearrangement is next performed as follows: Stir 36.75 grams (0.15 mole) of 1-carbamyloxy-2-hydroxy-3-(o-chlorophenoxy)propane in 150 milliliters of dry toluene. Add 19.5 grams of thionyl chloride. Slowly heat the mixture to reflux temperature. Maintain the temperature at about 110 degrees centigrade for 2 hours. Cool the mixture with the resultant formation of a voluminous precipitate. Filter the solid melting at 81–82 degrees centigrade. Recrystallize the solid from isopropyl alcohol to obtain 1-chloro-2-carbamyloxy-3-(o-chlorophenoxy)propane melting at 81.2–82.0 degrees centigrade and having the following percentage analysis, based on an empirical formula of $C_{10}H_{11}Cl_2NO_3$:

|  | Carbon | Hydrogen | Nitrogen |
|---|---|---|---|
| Calculated | 45.45 | 4.17 | 5.30 |
| Found | 45.72 | 4.35 | 5.48 |

Acylate and cyclize the 1-chloro-2-carbamyloxy-3-(o-chlorophenoxy)propane as follows:

Mix 5.28 grams (0.02 mole) of the 1-chloro-2-carbamyloxy-3-(o-chlorophenoxy)propane with 0.03 gram of zinc chloride and 2.3 grams of acetic anhydride in a reaction flask. Place an oil bath around the reaction flask. Heat the oil bath to a temperature of 100–120 degrees centigrade for three hours. A hard paste forms in the reaction flask. Crystallize the paste from a solvent mixture of ethanol and water to obtain crystals melting at 66.5–69.0 degrees centigrade. Recrystallize from pentane solvent to obtain 1-chloro-2-(N-acetylcarbamyloxy)-3-(o-chlorophenoxy)propane melting at 69.7–70.2 degrees centigrade, having the following percentage analysis, based on an empirical formula of $C_{12}H_{13}Cl_2NO_4$:

|  | Carbon | Hydrogen | Nitrogen |
|---|---|---|---|
| Calculated | 47.08 | 4.38 | 4.57 |
| Found | 46.80 | 4.00 | 4.61 |

Treat the 1-chloro-2-(N-acetylcarbamyloxy)-3-(o-chlorophenoxy)propane with 10 percent aqueous sodium hydroxide solution to obtain a clear solution in which a precipitate soon forms at a pH of 11.0. Filter the crystalline product (about 70 percent yield). Recrystallize the product from ethyl acetate solvent to obtain 5-(2-chlorophenoxymethyl)-2-oxazolidone melting at 150.5–150.8 degrees centigrade. A melting point of 151 degrees centigrade for this compound was found by Beasley et al., Quarterly Journal of Pharmacy and Pharmacology, London, volume IX, page 13.

EXAMPLE 6

*Production of intermediate 1-chloro-2-(N-acetylcarbamyloxy)-3-(o-methylphenoxy)propane and 5-(o-methylphenoxymethyl)-2-oxazolidone*

Prepare the starting material, 1-chloro-2-carbamyloxy-3-(o-methylphenoxy)propane, as follows: React diethyl carbonate with 3-(o-methylphenoxy)-1,2-propanediol to produce 4-(o-methylphenoxymethyl)-2-dioxolone, melting at 95.4–96.0 degrees centigrade. See Ludwig et al., Journal of the American Chemical Society, volume 73, page 5894. Then ammonolyze the 4-(o-methylphenoxymethyl)-2-dioxolone with ammonia to produce a mixture of 1-hydroxy - 2 - carbamyloxy-3-(o-methylphenoxy)propane melting at 115.0–115.6 degrees centigrade and 1-carbamyloxy - 2 - hydroxy - 3 - (o - methylphenoxy)propane melting at 92.0–93.0 degrees centigrade. The latter compound was prepared by Yale et al., Journal of the American Chemical Society, volume 72, page 3715. Separate the isomers by fractional crystallization.

Mix one part by weight of the 1-carbamyloxy-2-hydroxy-3-(o-methylphenoxy)propane with a molar excess of thionyl chloride in toluene solvent. Heat the mixture to reflux and continue heating until the evolution of hydrogenchloride and sulfur dioxide gases ceases. Bubble dry air through the reaction mixture to sweep out the gases. Cool the mixture and recover, using procedures as set forth in the previous examples, 1-chloro-2-carbamyloxy-3-(o-methylphenoxy)propane, melting at 87.2–88.0 degrees centigrade and having the following percentage analysis, based on an empirical formula of $C_{11}H_{14}ClNO_3$:

|  | Carbon | Hydrogen | Nitrogen | Chlorine |
|---|---|---|---|---|
| Calculated | 54.31 | 5.79 | 5.75 | 14.55 |
| Found | 54.36 | 6.04 | 5.68 | 14.30 |

Acylate the 1-chloro-2-carbamyloxy-3-(o-methylphenoxy)propane as follows: Mix one part of the 1-chloro-2-carbamyloxy-3-(o-methylphenoxy)propane with a molar excess of acetic anhydride and a quantity of zinc chloride. Heat the mixture for several hours. Recover 1-chloro-2-(N-acetyl-carbamyloxy) - 3 - (o-methylphenoxy)propane, melting at 93.5–94.5 degrees centigrade, and having 5.02 percent nitrogen (calculated analysis based on an empirical formula of $C_{13}H_{16}ClNO_4$ is 4.90 percent).

Cyclize the 1-chloro-2-(N-acetylcarbamyloxy)-3-(o-methylphenoxy)propane with 10 percent aqueous sodium hydroxide solution to obtain 5-(o-methylphenoxymethyl)-2-oxazolidone, melting at 125.5–126.5 degrees centigrade. Beasley et al., Quarterly Journal of Pharmacy and Pharmacology, London, volume IX, page 13, report a melting point of 127 degrees centigrade for this compound.

EXAMPLE 7

*Production of intermediate 1-chloro-2-(N-acetylcarbamyloxy)-3-(2-naphthyloxy)propane and 5-(2-naphthyloxymethyl)-2-oxazolidone*

Prepare the starting material, 1-chloro-2-carbamyloxy-3-(2-naphthyloxy)propane, as follows: React diethyl carbonate with 3-(2-naphthyloxy)-1,2-propanediol in a manner similar to that set forth in the preceding example, to produce 4-(2-naphthyloxymethyl)-2-dioxolone, melting at 127.0–127.5 degrees centigrade. Then ammonolyze this 4-(2-naphthyloxymethyl)-2-dioxolone with ammonia to produce a mixture of 1-hydroxy-2-carbamyloxy-3-(2-naphthyloxy)propane melting at 150.8–151.0 degrees centigrade and 1-carbamyloxy-2-hydroxy-3-(2-naphthyloxy)propane melting at 144.5–145.0 degrees centigrade. Separate the isomers by fractional crystallization.

Mix one part by weight of the 1-carbamyloxy-2-hydroxy-3-(2-naphthyloxy)propane with a molar excess of thionyl chloride in toluene solvent. Heat the mixture to reflux and continue heating until the evolution of hydrogen chloride and sulfur dioxide gases ceases. Bubble dry air through the reaction mixture to sweep out the gases. Cool the mixture and recover using procedures as set forth in the previous examples, 1-chloro-2-carbamyloxy-3-(2-naphthyloxy)propane melting at 125.5–126.0 degrees centigrade having the following percentage analysis, based on an empirical formula of $C_{14}H_{14}ClNO_3$:

|  | Carbon | Hydrogen | Nitrogen | Chlorine |
|---|---|---|---|---|
| Calculated | 60.11 | 5.05 | 5.01 | 12.67 |
| Found | 60.05 | 5.01 | 4.45 | 12.05 |

Acylate the 1-chloro-2-carbamyloxy-3-(naphthyloxy)propane as follows: Mix one part of the 1-chloro-2-carbamyloxy-3-(2-naphthyloxy)propane with a molar excess of acetic anhydride and a small quantity of para-toluenesulfonic acid. Heat the mixture for several hours. Recover 1-chloro-2-(N-acetylcarbamyloxy)-3-(2-naphthyloxy)propane melting at 110.5–111.0 degrees centigrade and having the following percentage analysis, based on an empirical formula of $C_{16}H_{16}ClNO_4$:

|  | Carbon | Hydrogen | Nitrogen |
|---|---|---|---|
| Calculated | 59.72 | 5.01 | 4.35 |
| Found | 60.02 | 5.22 | 4.50 |

To cyclize, dissolve the 1-chloro-2-(N-acetylcarbamyloxy)-3-(2-naphthyloxy)propane in acetone and treat the solution with 10 percent aqueous sodium hydroxide solution to obtain 5-(2-naphthyloxymethyl)-2-oxazolidone, melting at 193.2–193.6 degrees centigrade and having the following percentage analysis, based on an empirical formula of $C_{14}H_{13}NO_3$:

|  | Carbon | Hydrogen | Nitrogen |
|---|---|---|---|
| Calculated | 69.12 | 5.38 | 5.75 |
| Found | 69.28 | 5.27 | 5.45 |

EXAMPLE 8

*Production of intermediate 1-chloro-2-(N-propionylcarbamyloxy)-3-(2-naphthyloxy)propane and 5-(2-naphthyloxymethyl)-2-oxazolidone*

Mix 5.59 grams (0.02 mole) of 1-chloro-2-carbamyloxy-3-(2-naphthyloxy)propane with 3.25 grams (0.025 mole) of propionic anhydride and 0.15 gram of p-toluenesulfonic acid in a reaction flask. Place an oil bath around the reaction flask. Heat the oil bath to a temperature of 100–110 degrees centigrade for 3 hours. Dilute the hot solution with 85 milliliters of dry methanol. Heat the solution to reflux and then cool. Crystals precipitate. Filter to obtain 5.0 grams (70 percent yield) of crude crystals, melting at 136.5–137.5 degrees centigrade. Recrystallize the crude crystals from methanol solvent to obtain 1-chloro-2-(N-propionylcarbamyloxy)-3-(2-naphthyloxy)propane, melting at 137.4–137.8 degrees centigrade and having the following percentage analysis, based on an empirical formula of $C_{17}H_{18}NClO_4$:

|  | Carbon | Hydrogen | Nitrogen |
|---|---|---|---|
| Calculated | 60.81 | 5.40 | 4.17 |
| Found | 60.29 | 5.48 | 4.03 |

Dissolve the 1-chloro-2-(N-propionylcarbamyloxy)-3-(2-naphthyloxy)propane in acetone and treat the solution with dilute sodium hydroxide. Recrystallize the product obtained from the ethanol solvent to obtain 5-(2-naphthyloxymethyl)-2-oxazolidone, melting at 193.0–193.6 degrees centigrade.

The invention can be embodied in other specific forms without departing from the spirit or essential characteristics thereof. The foregoing physical embodiments are therefore to be considered in all respects illustrative and not restrictive. The scope of the invention is indicated by the subjoined claims rather than by the foregoing description. All changes which come within the meaning and range of equivalency of the claims are therefore intended to be embraced therein.

Having described my invention, I claim:

1. 1-halo-2-(N-acylcarbamyloxy)-3-substituted propanes wherein acyl is the acyl radical of an alkanoic acid containing from one to ten carbon atoms, inclusive, and wherein the 3-substituent is an aryloxy radical of the benzene and naphthalene series, any substituents on the aryl group being selected from the group consisting of lower-alkyl, lower-alkoxy, halo, nitro, amino and trifluoromethyl.

2. 1-chloro-2-(N-acylcarbamyloxy)-3-substituted propanes wherein acyl is the acyl radical of an alkanoic acid containing from one to ten carbon atoms, inclusive, and wherein the 3-substituent is an aryloxy radical of the benzene and naphthalene series, any substituents on the aryl group being selected from the group consisting of lower-alkyl, lower-alkoxy, halo, nitro, amino and trifluoromethyl.

3. 1-chloro-2-(N-acetylcarbamyloxy)-3-(o-methoxyphenoxy)propane.

4. 1-chloro-2-(N-acetylcarbamyloxy)-3-(o-methylphenoxy)propane.

5. 1-chloro-2-(N-acetylcarbamyloxy)-3-(o-chlorophenoxy)propane.

6. 1-chloro-2-(N-acetylcarbamyloxy)-3-(2-naphthyloxy)propane.

7. 1-chloro-2-(N-propionylcarbamyloxy)-3-(2-naphthyloxy)propane.

References Cited by the Examiner

UNITED STATES PATENTS 3,042,711   7/62   Clark _____ 260—482

LORRAINE A. WEINBERGER, *Primary Examiner.*

LEON ZITVER, *Examiner.*